Nov. 21, 1967 — K. K. STEINERT — 3,353,881
CAGE FOR ROLLER BEARINGS
Filed April 1, 1965

INVENTOR
KURT K. STEINERT

United States Patent Office 3,353,881
Patented Nov. 21, 1967

3,353,881
CAGE FOR ROLLER BEARINGS
Kurt K. Steinert, Herzogenaurach, Germany, assignor to Industriewerk Schaeffler, OHG., Herzogenaurach, Germany, a corporation of Germany
Filed Apr. 1, 1965, Ser. No. 444,682
Claims priority, application Germany, May 30, 1964, J 25,943
2 Claims. (Cl. 308—217)

ABSTRACT OF THE DISCLOSURE

A novel cage for rollers comprised of two annular rims disposed in parallel planes and connected to one another by a plurality of cage bars uniformly spaced about the periphery which define the slots for accommodation of the rollers.

Prior art

Various designs of this type of cage are known and in addition to guiding the rollers, the cages, depending upon their construction, may simultaneously serve to retain the rollers in one or both radial directions by suitable shaping of the cross bars. When roller cages of this known type serve, for example, to accommodate bearing needles, they may be used as independent structural elements wherein the rollers roll on races formed by correspondingly shaped surfaces of the adjacent construction elements. However, these cages also can be assembled together with races and needles as a ready-to-be-installed bearing unit, independent of the construction of the adjacent units.

In the latter case, the cage with at least one race must form a compact structural unit which will not come apart during transportation. Therefore, in needle bearings of this type, the cage is disposed between lateral flanges on one of the bearing races. In this construction the ball race is first provided with a hardened flange and after the insertion of the cage in the race, a second flange is attached. The second flange may be formed by the subsequent attachment of a separately manufactured flange or if a sleeve formed without cutting is used as the bearing race, the second flange may be formed by flanging over the end of the race after insertion of the cage. In both instances, the forming of the second flange or rim requires an additional working step and if the flange is formed by flanging over the races, it has the disadvantage that the said portion of the sleeve cannot be hardened but must remain soft so that the subsequent formation of the second flange is possible.

It is an object of the invention to provide a novel cage for roller bearings which can be inserted into a bearing race with flanges on both sides.

It is another object of the invention to provide a novel cage for roller bearings whose outer diameter can be temporarily reduced for assembly.

These and other objects and advantages of the invention will become obvious from the following detailed description.

The invention

The cage of the invention for roller bearings for insertion into a race with flanges on both sides without additional process steps is comprised of two annular rims in parallel planes connected with one another by a plurality of cage bars uniformly spaced about the periphery which define the recesses for accommodating the roller elements, the said rims being provided at several points about their periphery with slots at recesses having smaller width than the width of the recesses and the slots of one rim being in alternate relation to the slots in the other rim.

A cage of this construction can have its outer diameter reduced by radial compression to such an extent that it may be inserted into the bearing across one of the flanges of the race. The radial compression causes the individual segments of the annular rims to approach one another until the contact areas of the slots abut against each other. During this radial compression, the cage bars will be slightly deformed but since the deformation is within the elastic range of the cage, the cage will resume its normal shape after insertion into the bearing race and release of the radial pressures. Because the slots have a smaller width than the recesses formed by the cage bars, the rollers cannot fall out of the cage during separate handling thereof.

The degree of reduction of the diameter of the cage by compression can be varied. The annular rims may be alternatively provided with slots on successive recesses or if a smaller reduction of the diameter is adequate, the annular rims may be alternatively provided with slots on several successively arranged recesses. Also, the width of the slots may be varied within certain limits, but care should be taken that the reduction of the cage diameter remains within the flexible deformation range of the cage bars.

Referring now to the drawing.

Figure 1:
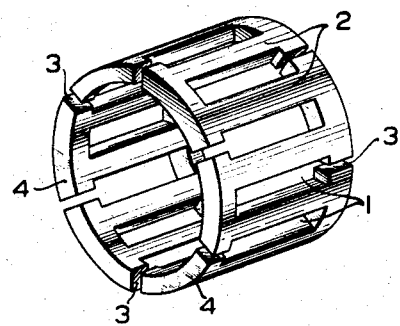
FIG. 1 is a perspective view of one embodiment of a cage according to the invention.

In the embodiment of FIG. 1, the sockets 1 of the cage which accommodate the roller elements are defined by cage bars 2 in the peripheral direction. The said cage bars 2 are connected at their axial ends by annular rims arranged in parallel planes, subdivided by slots 3 into annular rim segments 4. Upon application of radially directed forces, this type of cage may be reduced in its outer diameter until the planes of the annular rim segments 4, defining the slots 3, abut against each other. In this way it is possible to insert this type of cage into a bearing race having bilaterally rigid flanges. Following the insertion of the cage in the ball race when the radial forces no longer exert any action upon the cage, the cage will regain its original shape.

Figure 2:
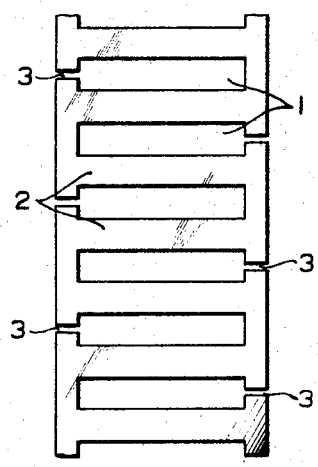
FIGS. 2 and 3 are plan views of two variable constructions of the cage.
Figure 3:
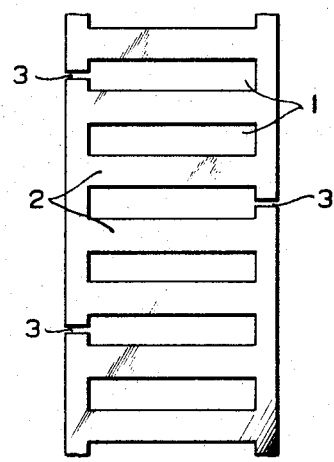

FIG. 2 shows an embodiment in which the slots 3 are disposed at each cage recess 1 and are arranged alternately on one annular ring and then on the other annular rim of the cage. FIG. 3 illustrates a cage in which after several successive recesses one of the annular rings is slot and then after several successive recesses, the second rim is provided with a slot. From the figures, it follows that the degree of reduction of the cage diameter is dependent on the number of the slots provided as well as on their width. Also, the figures show clearly that because the slots have a smaller width than the recesses, the roller elements to be accommodated with the recesses 1 are prevented from falling out of the same.

Various modifications of the cage of the invention may be made without departing from the spirit or scope thereof and it is to be understood that the invention is to be limited only as defined in the appended claims.

I claim:

1. A radially compressible cage for roller bearings comprised of two annular rims in parallel planes connected with one another by a plurality of cage bars uniformly spaced about the periphery which define recesses for accommodating roller elements, the said rims being divided into segments at several points about their periphery with slots at the recesses having a smaller width than the width of the recesses and the slots being alternatively provided at successive recesses in both annular rims, the outer diameter of which will be elastically reduced upon application of radially-directed forces until the annular rim segments abut against each other.

2. A radially compressible cage for roller bearings comprised of two annular rims in parallel planes connected with one another by a plurality of cage bars uniformly spaced about the periphery which define recesses for accommodating roller elements, the said rims being divided into segments at several points about their periphery with slots at the recesses having a smaller width than the width of the recesses, both annular rims being alternatively provided with said slots at recesses spaced by one or more further recesses, the outer diameter of which will be elastically reduced upon application of radially-directed forces until the annular rim segments abut against each other.

References Cited

UNITED STATES PATENTS 612,472  10/1898  Woodcock _____ 308—217

FOREIGN PATENTS 433,223  7/1925  Germany.

MARTIN P. SCHWADRON, *Primary Examiner.*

FRANK SUSKO, *Examiner.*